US006416046B1

(12) United States Patent
Hayday et al.

(10) Patent No.: US 6,416,046 B1
(45) Date of Patent: Jul. 9, 2002

(54) CLAMPING DEVICE FOR A WORKBENCH

(76) Inventors: George Hayday; Cynthia Hayday, both of 84 High Road, Wortwell, Harleston, Norfolk IP20 0EN (GB)

( * ) Notice: Subject to any disclaimer, the term of this patent is extended or adjusted under 35 U.S.C. 154(b) by 0 days.

(21) Appl. No.: 09/554,356

(22) PCT Filed: Nov. 6, 1998

(86) PCT No.: PCT/GB98/03329

§ 371 (c)(1), (2), (4) Date: May 12, 2000

(87) PCT Pub. No.: WO99/26765

PCT Pub. Date: Jun. 3, 1999

(30) Foreign Application Priority Data

Nov. 22, 1997 (GB) .............................................. 9724648
Sep. 14, 1998 (GB) .............................................. 9819801

(51) Int. Cl.⁷ .................................................. B23Q 3/02
(52) U.S. Cl. ........................ 269/139; 269/153; 269/155
(58) Field of Search ................................ 269/139, 153, 269/152, 154, 155, 220, 900, 901, 283, 104, 110, 111, 219, 303, 305

(56) References Cited

U.S. PATENT DOCUMENTS 4,352,489 A * 10/1982 Wagster ...................... 269/139
4,497,477 A * 2/1985 Abel .......................... 269/900

FOREIGN PATENT DOCUMENTS

GB 2 193 663 2/1988
GB 2 267 674 12/1993

* cited by examiner

*Primary Examiner*—Robert C. Watson
(74) *Attorney, Agent, or Firm*—Lee, Mann, Smith, McWilliams, Sweeney & Ohlson

(57) ABSTRACT

Supplementary jaw means is described for fitting to a clamping workbench transversely to the main jaws thereof at a position spaced from stop means at the other end of the main jaws, whereby operation of the drive means which moves the main jaws towards or away from each other will increase the distance between the supplementary jaw means and the stop means when operated in one sense, and will decrease the distance therebetween when operated in the other sense. A clamping workbench may be fitted with one supplementary clamping jaw means and a fixed stop for clamping a workpiece therebetween above the main clamping jaws.

20 Claims, 10 Drawing Sheets

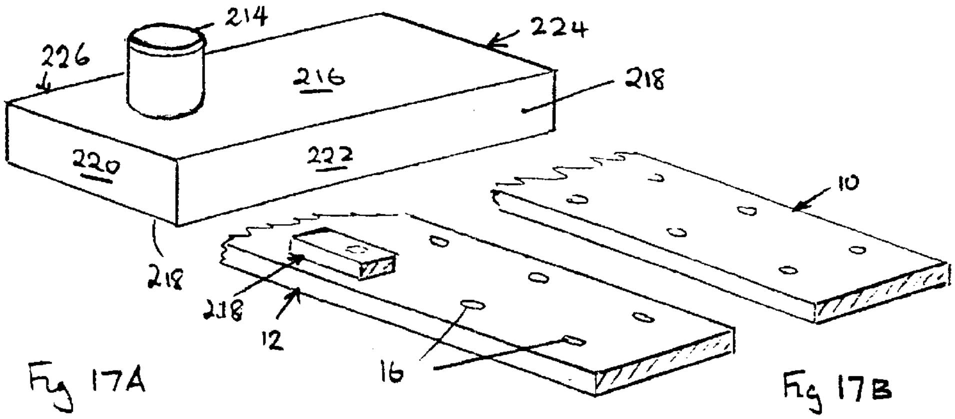
Fig 17A
Fig 17B
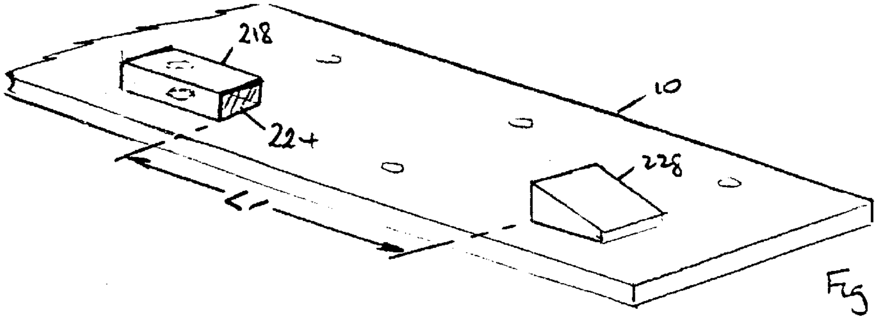
Fig 18A
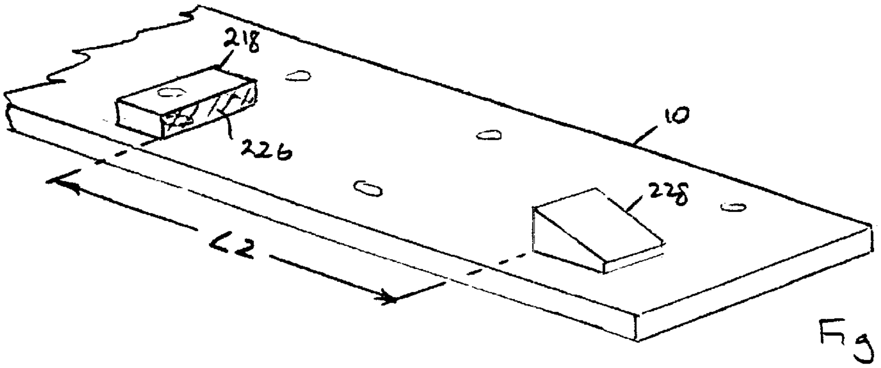
Fig 18B
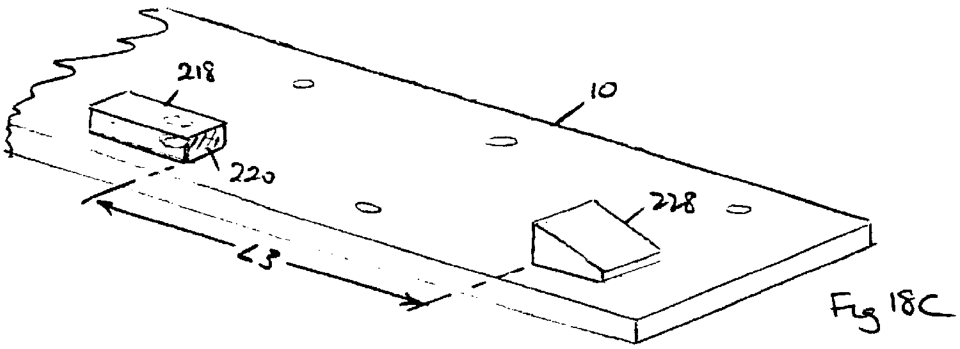
Fig 18C

CLAMPING DEVICE FOR A WORKBENCH

This invention relates to clamping workbenches such as those of the type sold under the Trade Mark WORKMATE and in particular to a secondary clamp for attachment thereto.

BACKGROUND OF THE INVENTION

The "Workmate" and similar portable and collapsible clamping workbenches are now well known. Briefly, they comprise two elongate jaws supported on folding legs, interconnected by threaded rods extending transversely to the longer dimension of the jaws and rotatable by handles to enable the jaws to be relatively moved, towards or away from one another. When closed, the two jaws constitute a workbench, but by opening the jaws a workpiece can be clamped therebetween, for example for sawing or planing or otherwise working on the workpiece. Where an item is too big to be clamped directly between the jaws, it is possible to accommodate the item to be worked on by inserting pegs into the jaws, and to clamp the item between the pegs. A series of apertures have therefore been provided in the two jaws to accommodate pegs at differing distances from the inboard edges of the two jaws.

However, even if the outermost apertures in the boards are used to receive the pegs, the jaws cannot be moved apart sufficiently to enable wide sheet material to be gripped between the pegs. Typically, standard 48" wide sheets of timber or laminate exceed the workpiece width which is capable of being worked upon by laying it across the workbench between pegs.

It is an object of the present invention to allow a clamping workbench to clamp an item whose width is too great to be clamped in the conventional manner by the jaws, even when fitted with the pegs.

THE INVENTION

According to a first aspect of the invention, in or for a clamping workbench comprising a main pair of jaws carried by a support, and workbench drive means for moving the main jaws towards or away from one another, a supplementary clamping jaw means is provided, adapted to be operatively joined to the main pair of jaws so as to be movable in a direction transverse to the direction of relative movement of the main jaws when the latter are relatively moved by the workbench drive means.

Typically the supplementary jaw is adapted to extend across at least in part both of the two main jaws.

It may extend perpendicularly to the main jaws or at an acute angle thereto.

In one arrangement the supplementary jaw is securable to the main jaws through a linkage which transmits the motion of the main jaws into a direction perpendicular to that motion, to produce the desired movement of the said supplementary jaw.

A second supplementary jaw may be provided, adapted to be fitted to the workbench so as similarly to extend transversely of the main jaws, but spaced from the first supplementary jaw, to allow a workpiece to be clamped between the two supplementary jaws in response to operation of the workbench drive means.

The second supplementary jaw may be adapted to be fixed to one of the two main jaws and be slidable relative to the other so as to permit the full relative movement of the two main jaws.

Alternatively where the workbench provides drive means at both ends of the main jaws for moving them together and apart, the second supplementary jaw may be adapted to be pivotally joined to both of the two main jaws at one end of the workbench whilst the first supplementary jaw is attached to the main jaws near the other end of the workbench, and when both supplementary jaws are so positioned, relative movement between the two supplementary jaws is achieved by operating the workbench drive means at the said other end of the workbench so as to increase or decrease the separation between the two main jaws at that said other end of the workbench only.

Each supplementary jaw may include a retaining lug for engaging the underside of a main jaw to prevent the supplementary jaw from lifting off the main jaws.

Each retaining lug may comprise an L-shaped bracket designed to accommodate the thickness of a main jaw between it and the underside of the supplementary jaw, or may comprise a member mounted at a distance below the supplementary jaw so as to extend below one or both of the main jaws.

To facilitate the fitting of a supplementary jaw when fitted with a retaining member, which is adapted to extend below both main jaws, the member may be movable relative to the underside of the supplementary jaw as by sliding or pivoting to assist in positioning the supplementary jaw or the main jaws.

Typically the supplementary jaw or jaws is/are located above the main jaws.

When fitted to a clamping workbench as aforesaid and mounted transversely to the main jaws thereof at a position spaced from stop means carried by the main jaws, operation of the workbench drive means in one sense will increase the distance between the supplementary jaw and the stop means (for example to allow a workpiece to be laid flat on the main jaws between the supplementary jaw and the stop means) and when operated in the opposite sense will decrease the distance between the supplementary jaw and the stop means to cause the workpiece to be gripped between the stop means and the supplementary jaw.

Conventionally the main jaws include openings into which pegs will fit, and the stop means may comprise one or more such pegs having enlarged heads to prevent them from passing completely through the openings, or the stop means may comprise a second supplementary jaw as aforesaid.

Conveniently the linkage members for mounting the supplementary jaw or jaws to the main jaws may include pegs adapted to be fitted into the stop peg openings in the main jaws.

Alternatively the end of each linkage members may be cut away to define an opening into which the enlarged head of a conventional peg can be received, the latter serving as an end stop for the linkage member.

One preferred arrangement comprises a supplementary jaw having an elongate slot in one longer edge thereof for receiving an end of a linkage arm which is secured therein for sliding and pivoting movement relative to the supplementary jaw, the other end of the linkage arm includes a peg adapted to be a push fit in an opening in one of the main workbench jaws, and the supplementary jaw includes a retention device in the form of an L-shaped bracket, one limb of which is spaced from its underside and defines therewith a channel which is adapted to engage the inner facing edge of the other of the main workbench jaws.

The spacing between the underside of a supplementary jaw and the retention device lug may be adjustable to accommodate different thicknesses of workbench jaw.

The invention finds application in particular to collapsible clamping workbenches sold under the Trade Mark "WORKMATE". Thus according to a further aspect of the invention, there is provided a secondary clamp for attachment to a collapsible clamping workbench sold under the Trade Mark WORKMATE, comprising a supplementary jaw and means for operatively connecting the supplementary jaw to the workbench jaws, whereby when an operating handle for moving one workbench jaw relative to the other is rotated, relative movement is effected between the said supplementary jaw and the main workbench jaws in a direction transverse to the direction of relative movement of the main workbench jaws, to enable a workpiece laid on the main workbench jaws between the supplementary jaw and stop means attached to one or both of the workbench jaws, to be clamped therebetween.

The stop means may comprise conventional "WORKMATE" pegs fitted into openings in the main workbench jaws or an elongate stop means extending transversely of the two main workbench jaws remote from the placement of the supplementary jaw.

The said elongate stop member may be formed from a single elongate strut adapted to be fitted to the main workbench jaws or may include two shorter elongate struts, one attached to one workbench and the other attached to the other workbench jaw and aligned as required.

In one embodiment the linkage comprises a pair of levers, one for attachment to each of the workbench jaws, each lever having at one end a cylindrical peg for pivotally fitting it into a circular peg stop receiving opening in one of the workbench jaws, and remote therefrom means for effecting a pivoting and sliding connection with the transverse supplementary jaw.

As the two workbench jaws are moved apart or together, the axis of rotation of the two levers are similarly moved apart or together, the levers rotate relative to the workbench jaws about their respective peg axes, and this causes the transversely extending secondary jaw member to move in a direction at right angles to the length direction of the workbench jaws since the remote ends of the levers are held captive therein.

By providing an elongate slot for the remote end of each of the levers, these can either diverge or converge between the supplementary jaw and the workbench jaws, thereby acting in either an outward or an inward sense, so altering the direction of movement of the supplementary jaw in response to the opening and closing of the workbench jaws.

In the simplest embodiment, one supplementary jaw member is fitted to the workbench jaws at one end thereof and conventional peg stops are inserted into holes in the workbench jaws at or near the other end thereof and, as there normally exist a series of holes for peg stops in each workbench jaw, different positions are possible for both the fixed stops and the movable supplementary jaw, by utilising different pairs of the holes in the workbench jaws for the peg stops and pivot pegs of the levers.

In a preferred embodiment, an elongate stop member is provided, adapted to abut the peg stops and extend across the gap between the workbench jaws, to provide better support for the edge of a workpiece.

In a further embodiment, the elongate stop member may include a bracket to engage the inner edge of one of the workbench jaws or an elongate retaining member spaced therefrom to protrude below one or both of the main jaws, to prevent the member from lifting when under pressure.

In a further embodiment, the elongate stop member may include a peg for fitting into an opening in one of the workbench jaws. Where it is desirable not to restrict the relative movement Of the latter, and it is also desirable to provide peg engagement between the elongate stop member and both workbench jaws, a second peg is provided which is slidable relative to the elongate stop member to accommodate relative movement of the workbench jaws.

In a still further embodiment, two similar supplementary jaws are provided, for mounting at opposite ends of the workbench, so that when so mounted relative movement of the workbench jaws results in orthogonal movement of each of the two supplementary jaws, albeit in an opposite sense, so as to clamp or release their grip on a workpiece located therebetween.

Conventionally the length of the workbench jaws is significantly greater than the maximum distance between the outermost edges thereof when opened to their maximum extent, measured perpendicularly to their length. Accordingly when a supplementary jaw and cooperating end stop (such as a second supplementary jaw) are fitted into holes in the workbench jaws at the extreme ends of the jaws, and thereby spaced to the widest possible extent, the space available for a workpiece therebetween is substantially greater than the corresponding spacing available in the conventional transverse sense between stops inserted in the openings provided in the main workbench jaws.

Where only one transverse supplementary jaw is attached to one end of a workbench and is movable transversely thereto, a single handed clamping action is made possible for the user, which is especially advantageous for repetitive work, since it is only necessary to turn the workbench jaw drive handle at the said one end of the jaws.

On the other hand, where two supplementary jaws are provided, joined to opposite ends of a pair of workbench jaws, the relative movement between the workpiece engaging supplementary jaws for a given number of turns of the workpiece drive, is magnified by a factor of 2, although in order to obtain dual movement, both ends of the workbench jaws must be moved in a similar manner and therefore where separate drive handles are provided, both drive handles must be rotated simultaneously and to the same extent.

In a further embodiment, the two levers joining a supplementary jaw to the two workbench jaws may cross over at a point between their ends and be pivotally attached at the crossing point to form a scissors action. By adjusting the crossing point position, so a magnifying or demagnifying effect of the workbench jaw movement can be obtained.

It is an advantage of the invention that the presence of the primary workbench jaws below the supplementary jaw means that a narrow workpiece clamped by the supplementary jaw does not fall between the supplementary jaw and the opposite clamping device (either stop pegs or a second supplementary jaw) when the clamping force exerted by the supplementary jaw is removed.

The pivoting linkage between the workbench jaws and supplementary jaw may be arranged so that the supplementary jaw moves in a direction to clamp a workpiece when the workbench jaws are moved together and vice versa.

Where the supplementary jaw in any cooperating stop member includes a restraining device which is to underlie a workbench jaw to prevent it from lifting when a clamping pressure is applied, the connection between the upper member and the restraining device may extend through an opening in a workbench jaw or around the rear edge of the jaw or more preferably across the clamping face of the workbench jaw, and to this end the connection is preferably formed from a thin structural member such as a metal strip so that the workbench jaws can be almost closed if desired.

According to a second aspect of the invention, a supplementary clamping jaw for fitting above the workbench jaws of a clamping workbench includes drive means for shifting the supplementary clamping jaw at right angles to the direction of clamping movement of the workbench jaws in response to inward or outward movement thereof, wherein the supplementary clamp jaw drive is adapted to fit between the opposed clamping faces of the workbench jaws.

The supplementary clamp jaw drive may comprise lever means acted on by spring means to engage a clamping face of one of the workbench jaws.

Two such sprung lever means may be provided for engaging both opposed clamping faces of two workbench jaws to provide a symmetrical arrangement.

A retaining member may extend from below the supplementary clamping jaw to engage the underside of one of the workbench jaws.

Two such retaining members may be provided to form a symmetrical arrangement for engaging the undersides of both workbench jaws.

The retaining members may simply comprise elongate lips protruding laterally of a vertical support which latter is adapted to extend between the two clamping faces of the workbench jaws.

The vertical support is preferably a thin wood, plastics or metal member.

One of the workbench jaw clamping faces may be formed with a plurality of pockets spaced apart therealong and adapted to accept and retain an end of a supplementary jaw drive lever.

The pockets may be formed by openings or slots in the jaw surface or may be a ratchet attached to or embedded at least in part in the jaw surface, or a strip of wood or metal or plastics material having openings formed therein and fitted to the edge of the jaw, or a frame adapted to fit snugly over the whole workbench jaw may be provided, the outer surface of the edge which overlies the clamping face of the jaw having formed therein the openings or pockets as specified.

Where a frame is employed, means may be provided to clamp or otherwise secure the frame to the workbench jaw. Where two levers are employed in the drive, a similar arrangement is preferably provided for the other workbench jaw to provide pockets along both opposed clamping faces of the two jaws.

According to another aspect of the present invention in or for a clamping workbench having a pair of relatively displaceable jaws, and drive means for moving one of the jaws towards and away from the other (or for moving both jaws relative to each other), and in which the jaws have openings therein into which pegs can be pushed to provide workpiece end stops upstanding from the workbench jaws, there is provided an improved peg stop therefor, having an enlarged head, wherein the peg is mounted asymmetrically relative to the head.

By asymmetrically mounting the head relative to the peg, the latter can be rotatably located in an opening in the workbench and rotated therein to provide a variation in the offset between the peg axis and the workpiece engaging face of the head.

The peg and opening may be cylindrical to allow full rotation or may be square or triangular in cross-section allowing for a correspondingly limited number of orientations to be achieved by lifting the peg and reinserting it.

The invention also lies in a clamping workbench having relatively movable primary clamping jaws when fitted with at least one supplementary clamping jaw means as aforesaid, and at least one fixed stop for clamping a workpiece therebetween above the primary clamping jaws, the orthogonal movement between the supplementary clamp jaw and the fixed stop required to effect the said clamping of the workpiece therebetween being effected by a translation of the movement of the primary clamping jaws of the workbench.

The invention also lies in a clamping workbench having relatively movable primary clamping jaws when fitted with two supplementary clamping jaws as aforesaid, mounted so as to produce opposed motion of the supplementary clamping jaws in response to the said relative movement of the primary clamping jaws, the supplementary clamping jaws being spaced apart along the length of the primary clamping jaws to permit a workpiece to be located therebetween and clamped up by effecting the usual movement of the primary clamping jaws of the workbench.

The invention also lies in a clamping workbench having two relatively movable primary clamping jaws having openings therein to receive peg stops, when fitted with at least one offset peg stop member as aforesaid, with its peg in one of the peg receiving apertures and rotatable into at least two positions so as to provide two different spacings between a clamping face of the offset peg and at least one other peg stop or supplementary clamping jaw as aforesaid.

The invention also lies in a clamping workbench as aforesaid having two relatively movable primary clamping jaws in combination with at least one supplementary clamping jaw means as aforesaid, and at least one offset peg stop as aforesaid.

The invention also lies in a kit of parts comprising a clamping workbench having two relatively movable primary clamping jaws, at least one supplementary clamping jaw means adapted to be secured to one or both of the primary clamping jaws to translate normal relative movement therebetween into an orthogonal clamping movement, and at least one offset stop peg adapted for insertion into a peg receiving opening of the primary jaws and at least one conventional peg stop also adapted to be fitted into a peg retaining opening in the primary jaws of the workbench.

DESCRIPTION OF EMBODIMENTS

The invention will now be described, by way of example, with reference to the accompanying drawings, in which:

FIG. 1 diagrammatically shows in plan view a secondary clamp incorporating one aspect of the invention, and applied to a clamping workbench;

FIG. 17 is a perspective view of the underside of an improved peg stop for use with a clamping workbench;

FIGS. 18A, 18B and 18C show how three different clamping distances from another stop can be obtained by differently positioning the peg stop of FIG. 17;

DETAILED DESCRIPTION OF THE DRAWINGS

The drawings illustrate the different aspects of the invention when applied to clamping workbenches such as sold under the Trade Mark WORKMATE.

Figure 1:
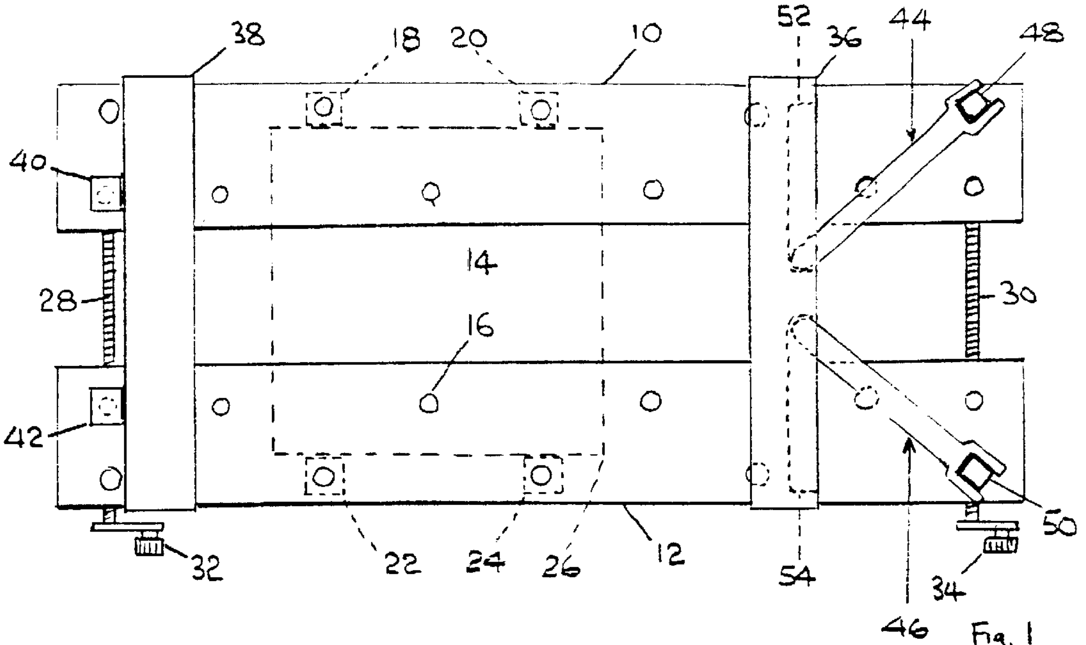

In FIG. 1 the workbench jaws generally in the form of two flat elongate boards 10 and 12 each have a series of holes 14, 16 along their lengths, respectively adjacent their inner and outer longitudinal edges. In use the holes 14, 16 can receive pegs 18, 20, 22 and 24 shown in dotted outline, enabling a workpiece 26 (also shown in dotted outline) to be clamped between the pegs (18, 20, 22 and 24) as the jaws 10, 12 are moved together. Movement of the jaws 10, 12 is enabled by two elongate screws 28, 30 extending transversely of the jaws 10, 12 and operable by handles 32, 34.

The secondary clamp comprises an elongate member 36 of timber, metal or possibly plastics material, orientated on the workbench transversely to the jaws 10, 12. A second elongate member 38 abuts against the two workbench pegs 40, 42 using any selected pair of workpeg holes from the two series of holes 14, 16.

Member 36 is linked to the jaws 10, 12 by means of two levers 44, 46, the ends of which engage square workbench pegs 48, 50 which are secured in holes in the two jaws 10, 12 and pivot relative to the jaws. The other ends are held captive in slots 52, 54 in the member 36 as later described in detail with reference to FIGS. 5A and 5B.

The jaw 36 may be linked to the main jaws 10, 12 using any selected pair of workpeg holes, one selected from each of the two series of holes 14, 16 in the two main jaws.

By virtue of the lever linkage, the member 36 is moved parallel to the length direction of the jaws 10, 12 ie towards or away from stop 38, when the jaws 10, 12 are moved towards one another by rotating one or both of the handles 32, 34.

The members 36, 38 thus constitute a movable jaw and a fixed jaw of a secondary clamp with a clamping action at right angles to that afforded by the jaws 10, 12.

It can readily be seen from FIG. 1 that when the jaws 36 and stop 38 are fitted at the extreme ends of the jaws 10, 12, a substantially larger workpiece can be gripped between them than is possible between pegs such as 18, 20 and 22, 24, using the jaws 10, 12, even if the outermost rows of apertures are utilised to receive the work pegs between which the workpiece is to be clamped.

The secondary clamp formed by movable clamping jaws 36 and fixed stop 38 has a one-handed action in that jaw 36 will move towards or away from 38 by rotating handle 34 alone, whereas both handles 32 and 34 must be rotated to properly operate the main clamping jaws 10 and 12.

It will also be appreciated that differing pairs of workbench peg positions can be used to locate the two separate pegs 20A and 20B so altering the basic clamping distance between them and the secondary clamp device 22 at the right hand end of the workbench, as shown.

Figure 2:
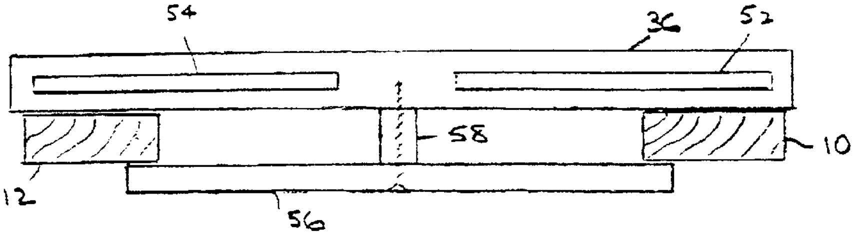
FIG. 2 is a diagrammatic elevation of the modified workbench of FIG. 1, in which the workbench legs are omitted.

In order to prevent the jaw 36 and stop 38 from lifting under clamping pressure, each member 36, 38 is connected to a respective restraining member beneath the main workbench jaws 10, 12. In FIG. 2 jaw 36 is shown joined to a restraining member 56 by a connecting member 58 which is relatively slim so that the jaws 10, 12 can still be moved close together and thus enable the range of movement transmitted to the jaw 36 is only minimally reduced.

Figure 3:
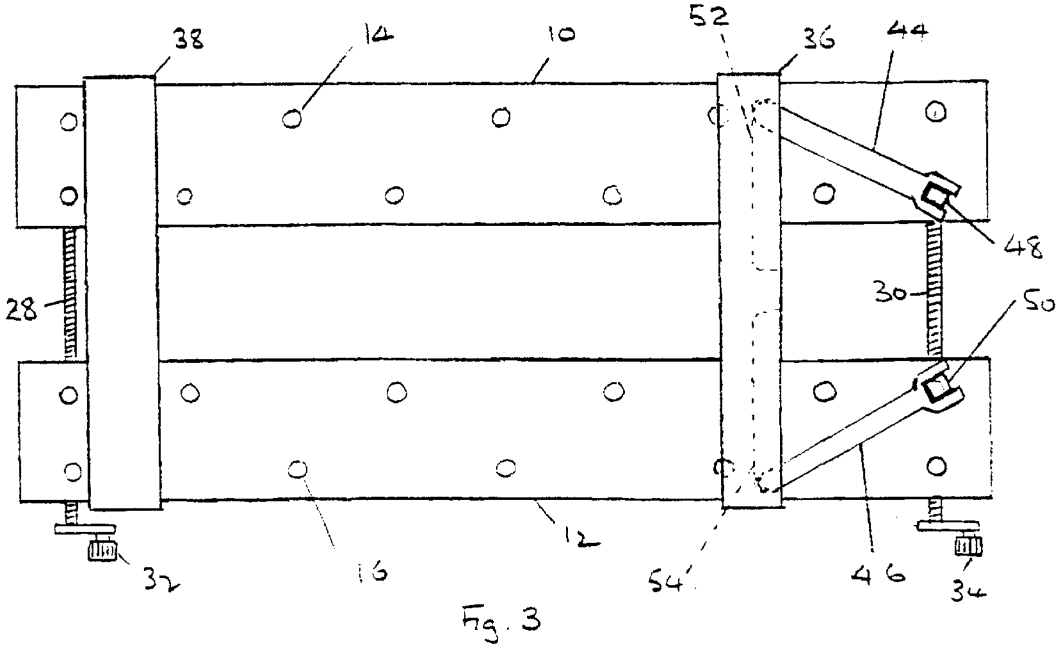
FIG. 3 is a plan view of a modification of the arrangement of FIG. 1.

FIG. 3 shows a modification in which the levers 44, 46 are differently arranged, so that the jaw 36 moves towards the fixed stop 38 when the separation between the jaws 10, 12 is increased.

Figure 4:
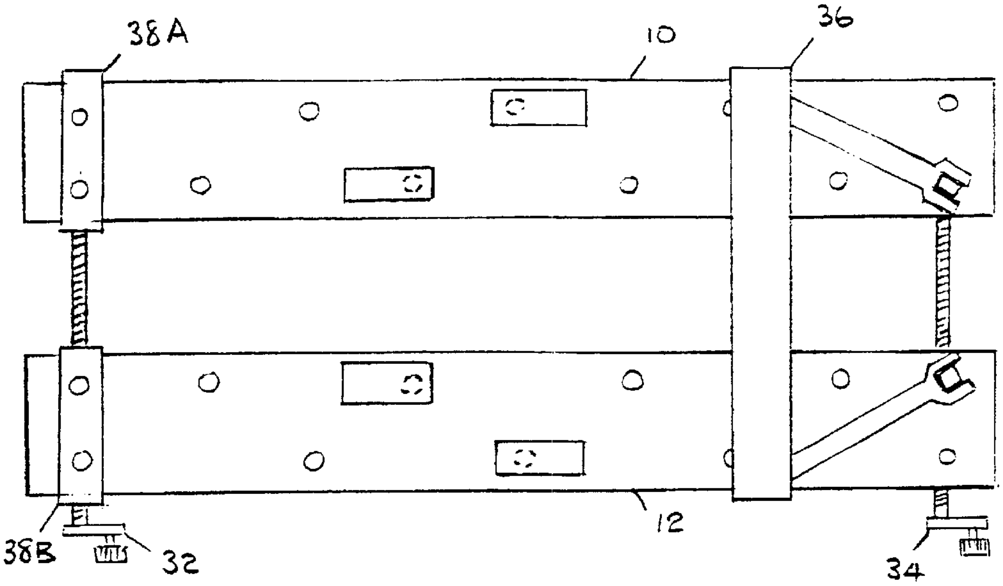
FIG. 4 illustrates modified stop members embodying the third aspect of the invention used in place of standard pegs in conjunction with a secondary clamp embodying the first aspect of the invention.

FIG. 4 shows how elongate stop 38 may be formed from two stop members 38A and 38B, fitted into workpeg holes at one end of the main jaws 10 and 12 with the supplementary clamp 36 fitted at the other end.

Figure 5A:
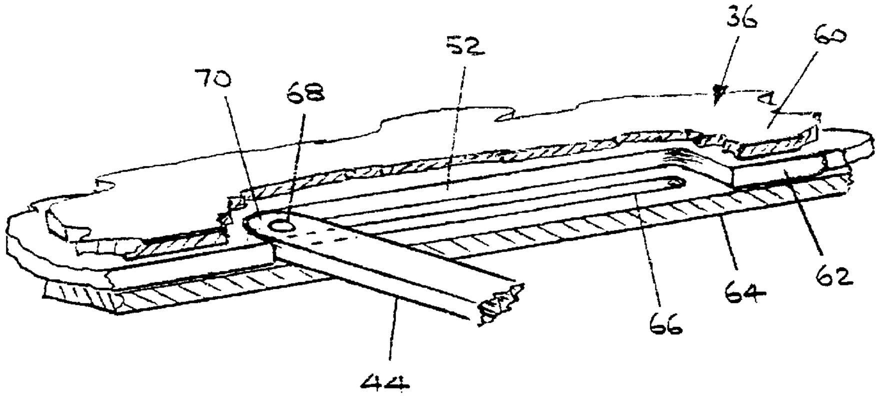
FIGS. 5A and 5B show the detail of a slot connection as incorporated into the secondary clamp of FIGS. 1 and 2.
Figure 5B:
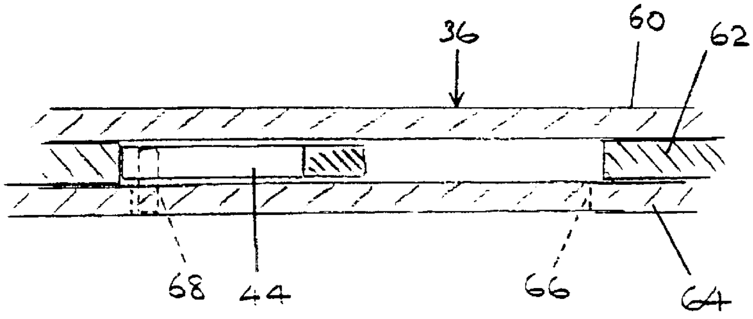

FIGS. 5A and 5B show in detail the manner in which a slot connection is effected between the levers 44, 46 and the jaw 36. Thus the member 36 can be constructed in three layers, namely a complete top layer 60, an intermediate layer 62 and a bottom layer 64. The latter includes a narrow elongated slot 66 which receives the lower end of peg 68 fitted so as to protrude below its lever (44 as shown) thus forming a T-slot connection. The intermediate layer 62 is cut away to define the slot 52, and the ends thereof are curved so as to match the curvature of the rounded end 70 of the lever 44.

The outer lever 46 is similarly received in the other cut-away slot 54 as shown in FIG. 1.

Further detail of the slot connection shown in FIGS. 5A and 5B is contained in FIGS. 6A to 6E.

Figure 6A:
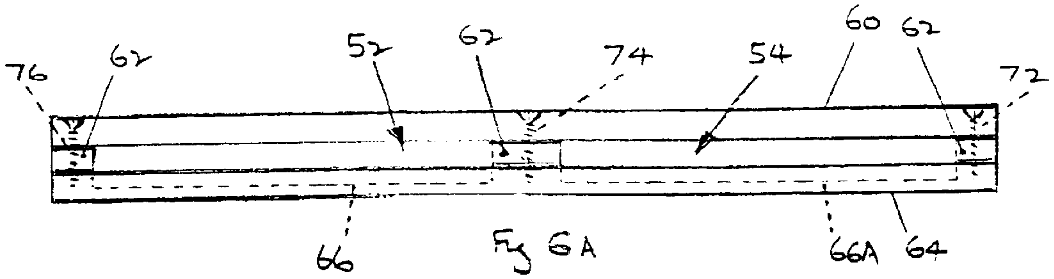
FIGS. 6A to 6E show further detail of the slot connection of FIG. 5.

FIG. 6A is a rear elevation of the clamp member 36 showing the top layer 60, the intermediate layer 62 and the slot for the lever 44 and the bottom layer 64 with the slot 66 for the peg 68 which prevents the lever from falling out of the member 36. The slot 66 should be of sufficient width to prevent undue pressure on the peg 68. Screws 72, 74, 76 secure together three layers of the clamp jaw 36.

Figure 6B:
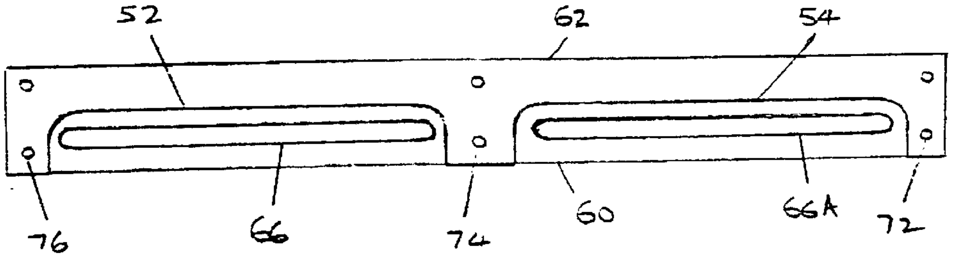

FIG. 6B is a plan view of the clamp jaw 36 with the top layer 60 and layers 44, 46 removed to reveal the slot 66 and the cutaway region forming slot 52.

Figure 6C:
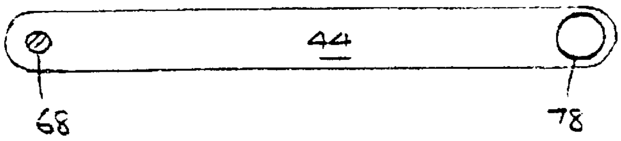

FIG. 6C is a plan view of the lever 44 indicating the peg 68 and a workpiece receiving hole 78 formed therein for receiving a peg for engaging one of the holes 14.

Figure 6D:
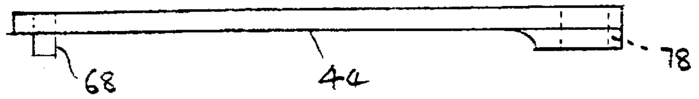

FIG. 6D is a corresponding side elevation of the lever 44 and peg 68 and peg receiving opening 78 associated therewith.

Figure 6E:
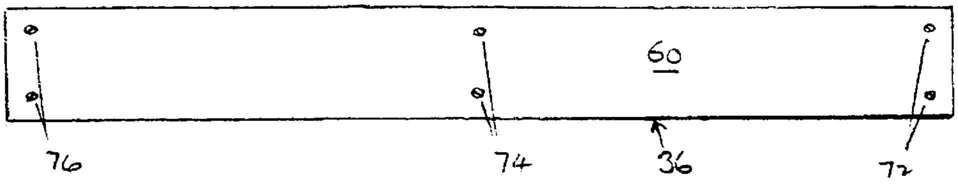

For completeness, FIG. 6E is a plan view of the assembled jaw 36 showing the securing screws 72, 74, 76 which fix together the layers 60, 62, 64.

In a modification (not shown) stop member 38 may be constructed in the same way as jaw 36 (using a linkage as shown in FIG. 1) so that at the expense of the loss of the single-handed action, the two secondary clamping jaws 36, 38 can be moved parallel to the length of the jaws 10, 12 when both the handles 32 and 34 are rotated.

It will be appreciated that the invention finds application outside the field of the clamping workbench known by the Trade Mark WORKMATE. It can also be supplied as an accessory to a clamping workbench (WORKMATE or otherwise) to which it is attachable, either as a single clamp or for cooperating with fixed peg stops or with a fixed end stop, or as a pair of movable clamping jaws having a dual clamping action, always in a direction at right angles to the main clamping workbench.

FIGS. 6A and 6B also show the similar slot 66A for the peg (not shown) of lever 46 and the cut-away slot 54 to receive lever 46 (not shown).

Figure 7:
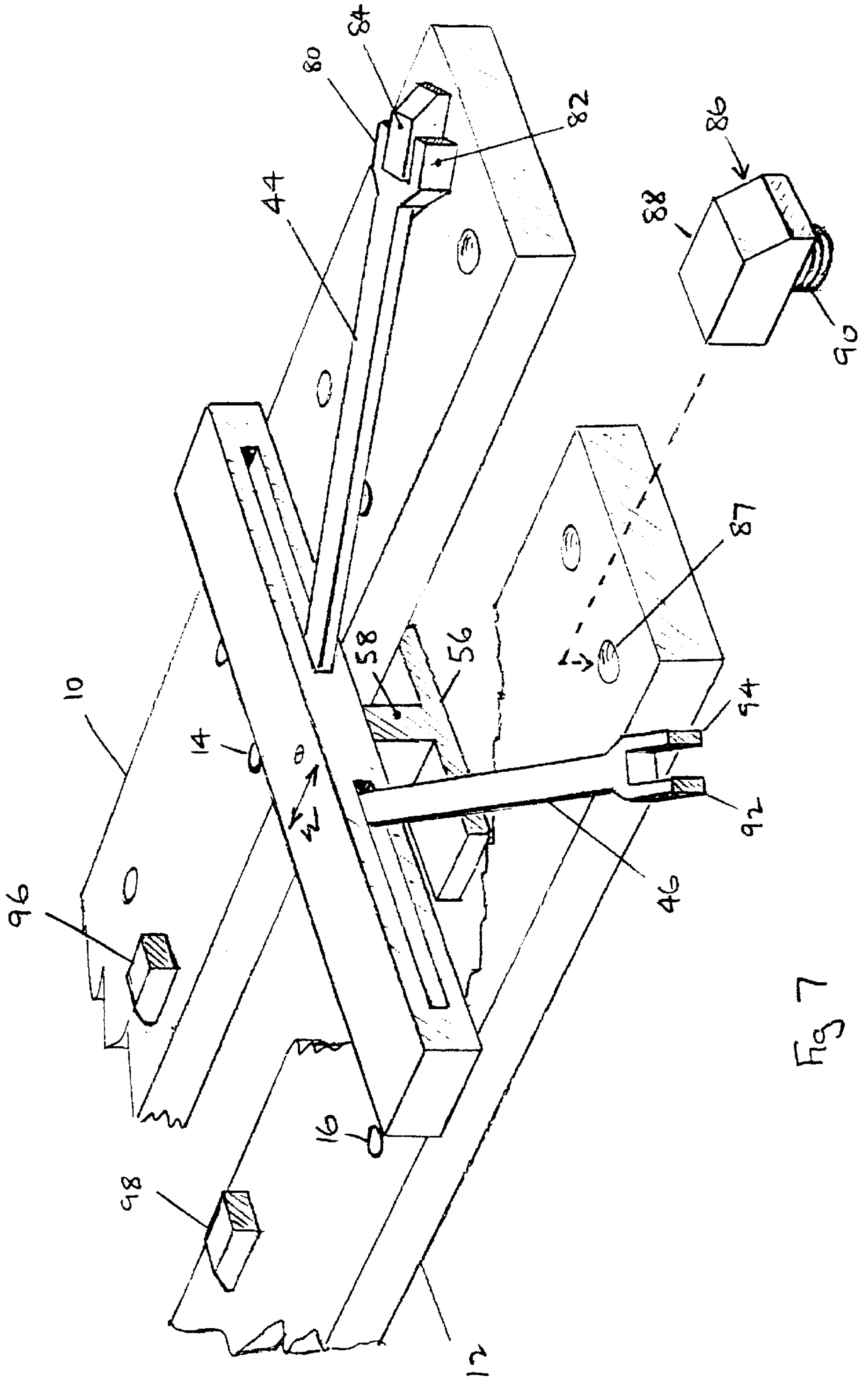
FIG. 7 is a perspective view of the clamping jaw, constructed in accordance with FIGS. 5 and 6, but in which the ends of the levers 44, 46 are adapted to fit around standard workbench peg stops.

FIG. 7 is a perspective view of the clamp jaw 36 when fitted to the right hand end of a clamping workbench having movable main jaws 10 and 12.

The bifurcated end of lever 44 includes two jaws 80 and 82 which are adapted to snugly fit and embrace the opposite sides of a rectilinear head of a peg stop generally designated 84 fitted into the right hand end outer hole of the set of holes 14 (see FIG. 1).

A similar peg stop 86 is shown waiting to be fitted into the corresponding hole 87 in jaw 12. This shows more clearly the rectilinear head 88 and the cylindrical peg 90 of the peg stop. Peg 90 is a tight fit in the hole 87.

The lever 46 is most simply attached to the peg stop 86 by pivoting the lever 46 until its two end jaws 92 and 94 straddle the hole 87 whereupon peg stop 86 can be dropped into position with the head 88 aligned with the parallel inside faces of the jaws 92, 94 and pushed down into the hole 87.

Spaced from the clamping edge of the clamp 36 and fitted into two more of the holes 14 and 16 are two similar peg stops 96 and 98. The choice of the holes into which the peg stops 96, 98 are fitted determines the general spacing between them and the clamping jaw 36 into which a workpiece can be fitted. Movement of the handle 34 (and if desired, also the handle 32 of the clamping workbench) so as to move the jaws 10 and 12 outwardly, will shift the supplementary clamping jaw 36 away from the peg stops 96 and 98 and rotation of the handle 34 (and also 32 is desired) in the opposite sense will move the clamping jaw 36 towards the peg stops 96 and 98 so as to securely clamp a workpiece between the jaw 36 and the peg stops 96 and 98.

The peg stops such as 84, 86, 96 and 98 may be formed from injection moulded plastics material or from metal or timber.

The levers 44 and 46 likewise may be formed from metal or wood, but preferably are formed from injection moulded plastics material.

The workpiece engaging face of the supplementary clamping jaw 36 is preferably formed from the timber but the rest of the member may be formed from plastics, metal or timber as desired.

As shown in FIGS. 1 and 7, the supplementary clamping jaw 36 is retained in position by means of the restraining member 56 secured below the underside of the two jaws 10 and 12 by means of the support 58.

As shown in FIG. 2, the restraining or retaining member 56 preferably extends symmetrically below both of the clamping workbench jaws 10 and 12 but it has been found sufficient for it to extend to either the left or the right of FIG. 2 so as to extend below one or other of the two clamping jaws only to serve the necessary purpose.

It is an advantage of the arrangement shown in FIG. 2 or the modification in which the retaining restraining member 56 extends below one or other of the two clamping jaws 10 and 12, is that the main clamping jaws 10 and 12 have to be moved apart by a distance somewhat greater than the width dimension W of the supplementary clamping jaw 36 to allow the member 56 to be slipped down between the two jaws 10 and 12 with the clamping jaw 36 substantially parallel to the jaws 10 and 12, after which once the retaining/restraining member 56 is below the jaws 10 and 12, the supplementary clamping jaw 36 can be rotated to the position shown in FIG. 7. The clamping jaws 10 and 12 can then be closed up as appropriate.

Figure 8:
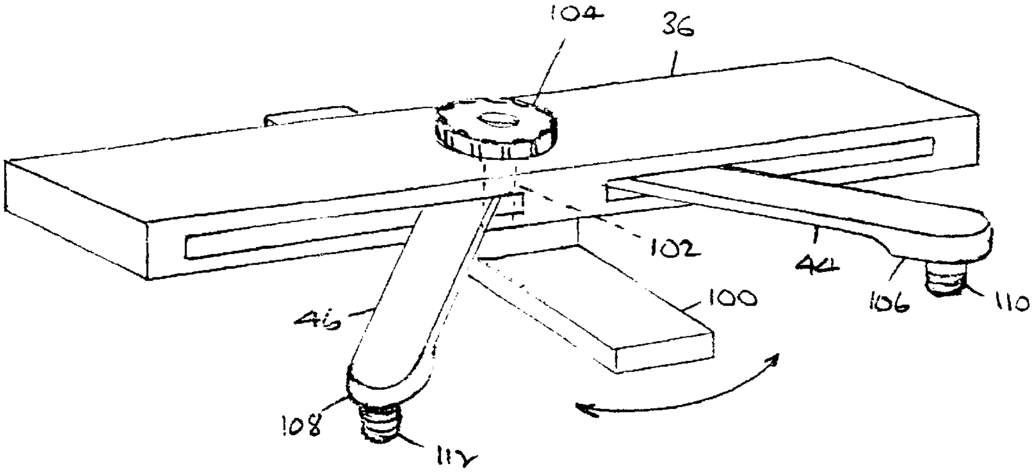
FIG. 8 is a similar perspective view to that of FIG. 7 in which the lever ends are formed with integral pegs for fitting directly into peg holes in the main workbench jaws.

An alternative and preferred arrangement is shown in FIG. 8 in which the retaining/restraining member 56 of FIG. 7 is replaced by a small rotatable member 100 attached to the lower end of a rotatable pin 102, the upper end of which carries a serrated knob 104 to allow member 100 to be rotated through at least 90°, if not through 360°.

Mounting the member 36 is then simplified in that it is only necessary to rotate knob 104 until the retaining member 100 is generally perpendicular to the longer dimension of the clamping jaw 36 to permit member 100 to be lowered between the jaws 10 and 12 of the clamping workbench after which rotation of the knob 104 through 90° locates the protruding arm or arms of the member 100 below one or both of the clamping jaws 10 and 12.

The opportunity has also been taken in FIG. 8 to show an alternative arrangement by which the levers can be pivotally attached to the clamping jaws 10 and 12. In each case the outboard end of the levers 44 and 46 are formed with an enlarged head 106, 108 respectively and extending below each of the enlarged heads are cylindrical pegs 110 and 112 respectively similar to the peg 90 which extends below the peg stop 86, and thereby adapted to be a tight rotational fit within the peg stop receiving openings 14 and 16 in the main clamping jaws 10 and 12. The supplementary clamping jaw 36 can therefore be fitted quickly and easily to the main clamping jaws 10 and 12 by simply rotating the retaining member 100 so as to be perpendicular to the clamping jaw 36, adjusting the two levers 44 and 46 so that the pegs 110 and 112 align with the two holes in the two workbench clamping jaws 10 and 12 into which they are to be fitted, pushing both pegs 110 and 112 into the respective holes and thereafter rotating the knob 104 to secure the supplementary clamp jaw 36 in position.

Figure 9A:
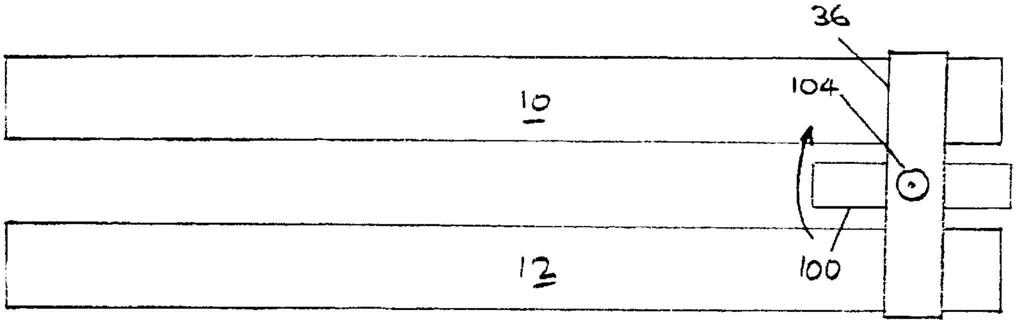
FIGS. 9A and 9B show how a retaining member for bridging below the main workbench jaws can be rotated to facilitate the fitting of the jaw of FIG. 8 to a workbench.
Figure 9B:
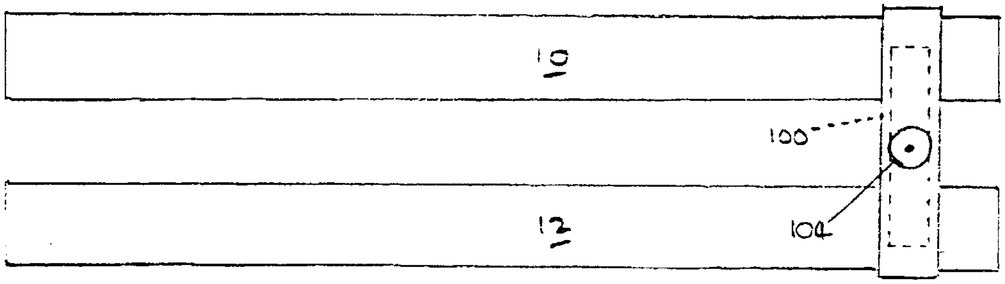

The simplicity of the arrangement is shown in FIGS. 9A and 9B. Thus in FIG. 9A the supplementary clamping jaw 36 is shown with the retaining member 100 rotated perpendicularly thereto which enables the clamping jaw 36 to be lowered into position on the two clamping jaws 10 and 12, and FIG. 9B shows the retaining member 100 shown rotated through 900 and now in hidden detail entirely below the item 36 and the clamping jaws 10 and 12, thereby retaining the supplementary jaw 36 in position above the two main clamping jaws 10 and 12. For simplicity the levers 44 and 46 are not shown in FIGS. 9A and 9B.

In an arrangement not shown in which a supplementary clamping jaw such as shown in FIG. 7 with a fixed retaining or restraining member 56 is to be fitted with levers such as shown in FIG. 8 with pegs 110 and 112 for fitting in peg receiving holes in the main workbench jaws 10 and 12, the arms 44 and 46 may be made of resilient springy material to enable the member 36 to be fitted in position as shown in FIG. 7 after which each of the levers 44 and 46 can be forced in an upward direction so that each of the pegs clears the upper surface of the workbench clamping jaws 10 and 12 and the levers are limited until the pegs 110 and 112 align with the holes into which they are to fit, after which then can be forced down into the holes.

In a further alternative arrangement the fit between the inboard ends of the levers 44 and 46 and the clamping jaw 36 may be sufficiently sloppy to accommodate up and down movement of the levers 44 and 46 sufficient to allow the pegs 110, 112 to clear the upper surface of the clamping jaws 10 and 12 of the workbench to allow the pegs to be moved into position and inserted into the selected holes.

Figure 10:
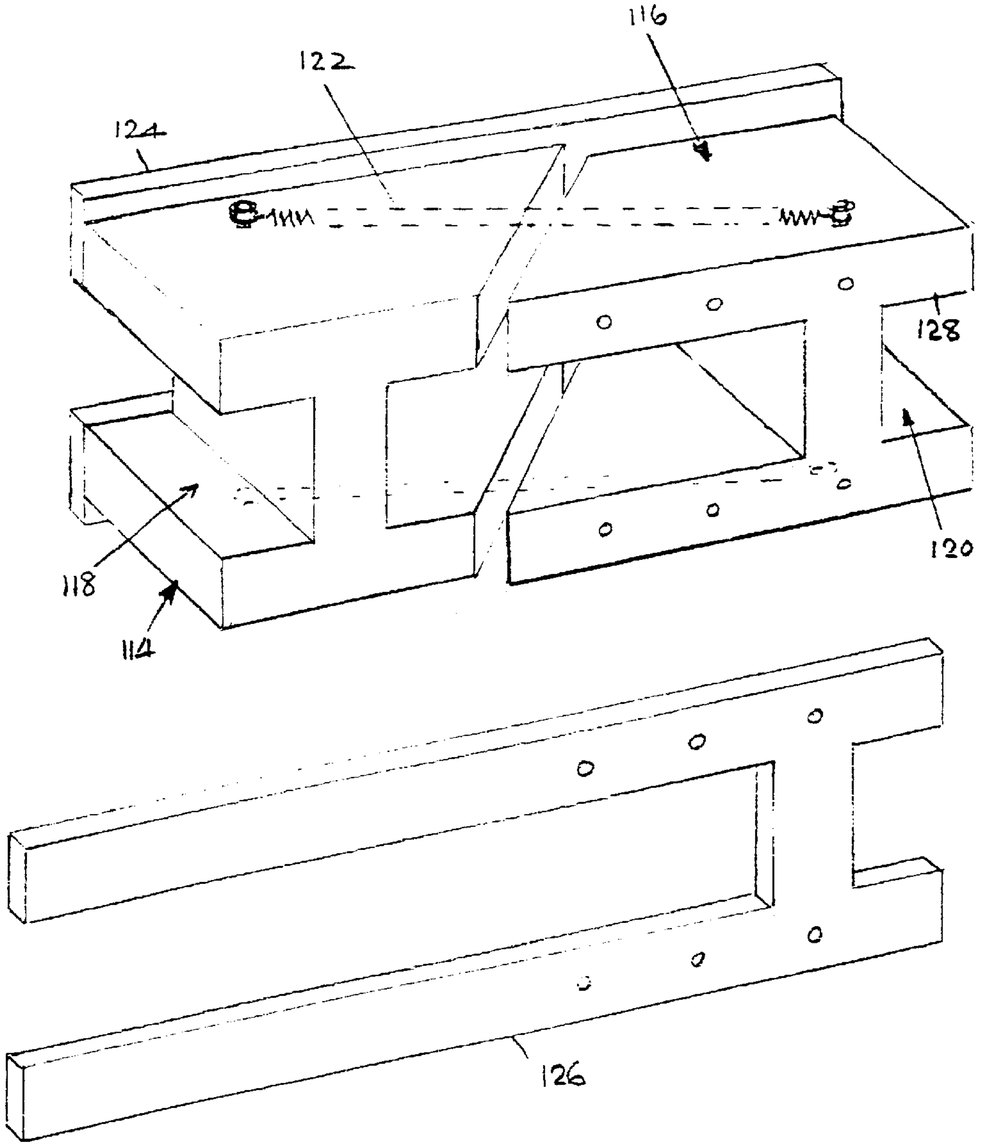
FIG. 10 illustrates an alternative clamping jaw assembly adapted for mounting between the main jaws of a clamping workbench.

FIG. 10 shows an alternative arrangement in which relative movement between two clamping jaws 10 and 12 is translated into movement perpendicular thereto utilising cooperating inclined surfaces. To this end two channel section members 114 and 116 each having a channel 118 and 120 respectively are adapted to be fitted to the opposite inner edges of two clamping work jaws 10 and 12 (such as shown in FIG. 1) with the jaws entering the slots 118 and 120 respectively. The opposing faces of the two members 116 and 118 are inclined relative to the direction of the slots 118 and 120 and are adapted to permit sliding between the two members 114, 116 and spring means diagrammatically shown at 122 clamps the two members 114, 116 together but in such a way that the spring force is less than the force of sliding friction between the two inclined surfaces of the members 114, 116 when the two said members are in aligned relationship with the surfaces perpendicular to the slots 118, 120 in substantial alignment.

The direction of action of the spring means 122 is such that if opposite forces are applied to the two members as by moving the jaws 10 and 12 towards each other by means of the drives 32, 34 the spring means becomes extended and there is a restoring force tending to align the two members 114, 116 in the event that the handles 32, 34 are unwound and the jaws 10 and 12 moved outwardly. The slots 118, 120 therefore remain clamped over the internal edges of the two clamping jaws 10 and 12 as they are moved outwardly, at least until a position is reached at which the two parts 116 and 118 become transversely aligned.

Face plates 124 and 126 are fitted to the larger ends of the two members 114 and 116. Thus faceplate 124 is attached to the rear face of the member 114 as shown and faceplate 126 (shown detached from the assembly) is attachable to the face 128 of the member 116. Attachment may be made by means of adhesive or more likely by means of rivets or screws.

The faceplates serve two purposes.

In the first place they may extend significantly beyond the ends of the members 114 and 116 so as to entrap the device on the workbench jaws to prevent the device from falling through the gap between the workbench jaws 10 and 12 if they are accidentally opened to a too great an extent.

In this event the entrances to the slots 118 and 120 may be made slightly divergent so as to prevent any tendency for jamming between the upper corners of the inwardly facing edges of the workbench jaws 10 and 12 and the slots 118 and 120 in the event that they become disengaged.

In addition the extended ends of the faceplates 124, 126 may be arranged to engage against peg stops which may be conventional peg stops or modified peg stops as described herein fitted into holes selected from two groups of holes 14 and 16 so as to position the device shown in FIG. 10 at a desired position along the length of the workbench jaws.

A similar device may be located albeit oppositely handed so as to provide another movable jaw at another position between the two main jaws 10 and 12 or peg stops which may be simple standard peg stops or modified peg stops as described herein may be fitted into other holes selected from the groups 14 and 16 and positioned and spaced from the faceplate 126 or 124 as appropriate so as to engage the opposite end of a workpiece clamped between them and the appropriate faceplate of the device shown in FIG. 10.

The two parts of the device shown in FIG. 10 may both be similar in shape and size and therefore may both be moulded from the same injection mould.

The angle between the two members may be more or less acute than that shown in the drawing. Selecting different angles will alter the displacement of one part relative to the other for unit movement of the clamping jaws 10 and 12 and will also determine the translation of force exerted by the drives 28 and 30 in the perpendicular direction through which that movement is translated by the device shown in FIG. 10. The angle is therefore selected accordingly.

Although spring means is only shown at the top of the device shown in FIG. 10, similar spring means may be provided on the underside of the device or the spring means may be located midway between or incorporated into cavities formed in the two members 114, 116 during their manufacture and typically facing each other across the cooperating inclined face.

Figure 11:
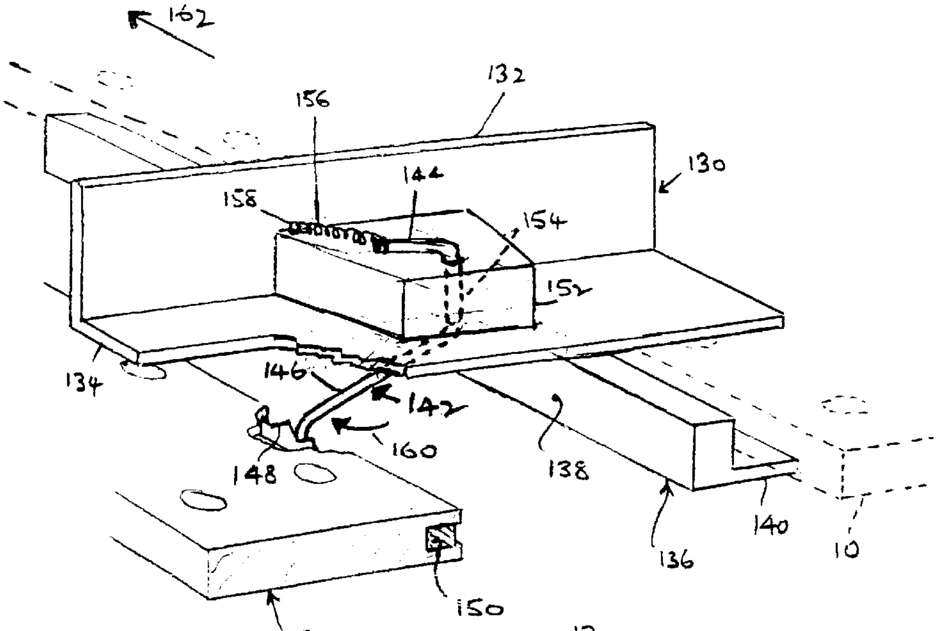
FIG. 11 illustrates a further alternative clamping jaw assembly adapted for mounting between the main jaws of a clamping workbench.

FIG. 11 shows an alternative arrangement in which the clamping jaw 36 is in the form of a right-angled channel 130, the upright wall 132 of which comprises the workpiece engaging face and the horizontal face 134 of which is adapted to overlie the workbench jaws 10 and 12. Workbench jaw 12 is shown partly cut away and workbench jaw 10 is shown in dotted outline so as not to hide details of the structure of the supplementary clamp 130.

Channel 130 is held in position by two devices. The first is a fixed right-angled clamping retaining member 136 which is secured to the underside of face 134 and may be formed from a vertical wall 138 and a horizontal plate 140 which is adapted to slidingly engage the underside of jaw 10. The other device is a pivoted lever generally designated 142 which is formed from bent steel rod or the like and includes a short upper arm 144, and a longer lower arm 146, the outboard end of which is bent slightly to form a foot which is adapted to engage in a ratchet surface, part of which can be seen in the cut-away region of clamping jaw 12 at 148 and which is at the base of a groove formed along the inboard face of jaw 12 as seen at 150 at the right hand end of jaw 12 in FIG. 11.

To provide a bearing for the rod 142, a block 152 is mounted within the right-angled channel 130 and a cylindrical bore 154 accommodates a generally straight section of the rod between the shorter arm 144 and the longer arm 142. A spring 156 joins the end of the shorter lever arm 144 to a point 158 on the block 152.

The action of the spring is to rotate the arm 144 and therefore the arm 146 in the direction of the arrow 160 and fitting the device shown between the clamping jaws 10 and 12 requires the arm 146 to be rotated in an opposite sense against the action of spring 156 to reduce the overall distance between the outboard end of lever arm 146 and the restraining member 136. This allows these two members to be dropped between the inwardly facing edges of the clamping jaws 10 and 12 after which the retaining face 140 can be fitted below clamping jaw 10 and the arm 146 can be allowed to spring into engagement with one of the ratchet slots in the opposed face of clamping jaw 12.

As the jaws are moved together by rotating handles 32 or 34 or both (see FIG. 1), the end of the lever arm 146 remains trapped in the ratchet slot and since the space available for the lever arm 146 and the member 136 is now reducing, the angle between the lever arm 146 and the member 136 has to be reduced to accommodate the reducing dimension. This requires the vertical region of the rod 142 extending through the block 152 to move in the direction of the arrow 162 causing the channel member 130 to be moved in the same direction as the arrow 162. Sliding movement between 130 and clamp jaw 10 is facilitated by the smooth underside of the channel section 134, the smooth inside face of the member 138 and the smooth upper surface of the retaining flange 140 of the retaining device 136.

It is an advantage of this embodiment that the device can be fitted at any point along the length of the clamping jaws 10 and 12 and can be readily located and relocated relative to the jaws by simply squeezing the arm 146 towards the member 136 so as to disengage the end of the arm 146 from the ratchet 150, and sliding the assembly relative to the jaw 10 until the member 132 is in the desired position. Simply letting go the arm 146 and allowing it to spring into position will immediately locate the device at that point, and fine adjustment can be made by moving the clamping jaws 10 and 12 together so as to move the channel member 130 and therefore the face 132 into contact with a workpiece located immediately on the other side of it to clamp the workpiece between the rear face of the member 132 as shown in FIG. 11, and whatever stop means has been chosen for the other end of the workkpiece, relative to the workbench jaws 10 and 12.

The arrangement shown in FIG. 11 can be used in conjunction with fixed peg stops such as are normally supplied with a clamping workbench such as the WORKMATE, modified peg stops such as described herein or an elongate end stop such as 38 in FIG. 1, or an adjustable stop such as shown at the right hand end of FIG. 1 in the form of a supplementary clamping jaw 36. Alternatively another supplementary jaw such as shown in FIG. 11, may be mounted in a reverse sense to that shown so that its clamping surface faces that of member 130 at the appropriate distance to receive a workpiece therebetween. Adjusting the clamping jaws 10 and 12 so as to move them together will cause the channel members of each of the supplementary clamping jaws to move towards the other and firmly clamp the workpiece therebetween.

Figure 12:
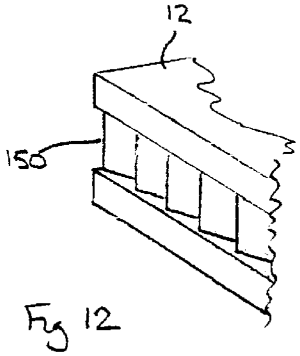
FIG. 12 shows a modification of one of the inside faces of the main jaws of the clamping workbench to facilitate the locking in place and effecting of the orthogonal movement of the secondary clamping jaw.

FIG. 12 shows in a scrap section part of the slot containing the ratchet 150 in the inboard face of the workbench jaw 12.

Figure 13:
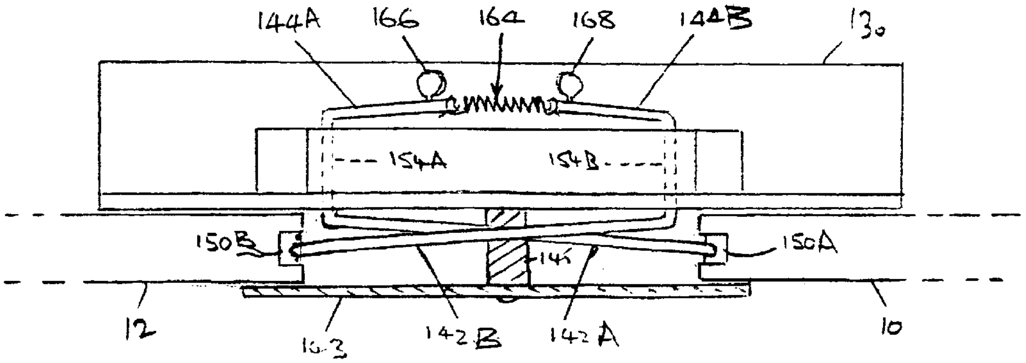
FIG. 13 shows how the locking modification of the embodiment shown in FIG. 12 can be applied to both faces of the main jaws of the workbench.

As shown in FIG. 13, two rod members 142A and 142B may be provided operating through two spaced apart vertical drillings 154A, 154B to cooperate with two ratchets, one provided on each of the inboard faces of the two clamping jaws 10 and 12. Two ratchets are identified by reference numerals 150A, and 150B.

The spring may now be arranged between the two shorter ends 144 and 144B and to this end the spring is denoted by reference numeral 164.

Upstanding pads 166 and 168 facilitate the pushing apart of the two levers so as to disengage the two outboard ends of 142A and 142B from their two ratchets respectively.

The supplementary clamping jaw is held in place on the jaws 10, 12 by a T-bar, comprised of a horizontal T-bar 143 joined to the underside of member 130 by an upright leg 145. In all other respects the device shown in FIG. 13 operates in exactly the same way as that shown in FIG. 11 and can cooperate with different stops at the opposite end of a workpiece it is to engage in exactly the same way as described in relation to FIG. 11.

Figure 14:
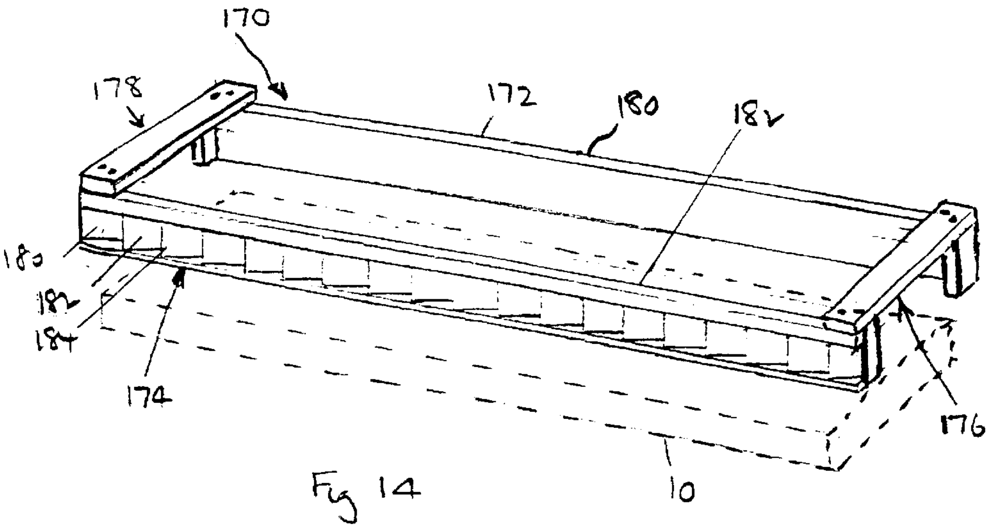
FIG. 14 illustrates how a ratchet surface may be provided in the inside face of a main jaw of a workbench.

The need to modify the inboard faces of one or both of the clamping jaws 10 and 12 of a conventional clamping workbench can be obviated by using a device such as shown in FIG. 14. This comprises an elongate frame generally designated 170 formed from two longer angled sections 172 and 174 and two equal shorter end sections 176 and 178.

The internal spacing between the two longer elements 172, 174 is equivalent to the width dimension of the clamping jaw 10. This permits the frame 170 to be fitted over jaw 10 and the end struts 176 and 178 rest on the ends of the jaw 10 and retain the frame in position thereon.

The external face of elongate member 174 is formed with ratchet teeth some of which are designated 180, 182, 184, for engagement by the outer end of a lever arm such as 142 of the device shown in FIG. 11.

Where two such ratchets are required, a similar member is located over the other clamping jaw 12 with the ratchet face of the other frame facing the ratchet face 174 of the unit 170 retained on clamping jaw 10.

Screws or clamps or spring flaps may be employed to retain the frame or frames on the clamping jaw or jaws.

To assist in understanding of the arrangement, clamping jaw 10 is shown in dotted outline below the frame 170 in FIG. 14.

Figure 15:
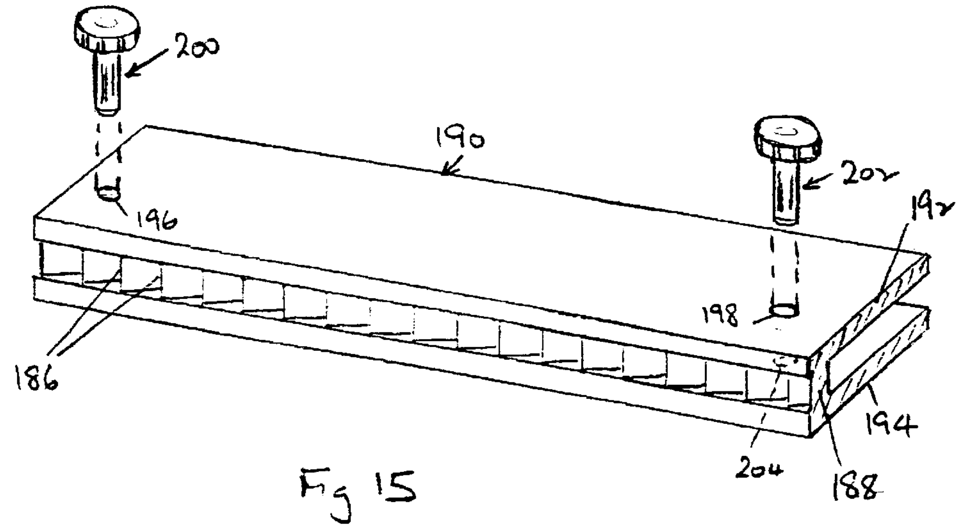
FIG. 15 shows an alternative device to that of FIG. 14.

A modification of the arrangement shown in FIG. 14 is shown in FIG. 15. Here ratchet teeth 186 are formed along the narrow bridging section 188 of a channel member designated 190 having an upper plate 192 and a lower plate 194 spaced apart by the thickness of a clamping jaw such as 10. Holes 196 and 198 are formed in the upper plate 192 similar in size and spacing to holes such as the inner line of holes 14 in clamping jaw 10 of FIG. 1 to allow retaining pegs 200, 202 to be pushed through the holes 196, 198 and through aligned holes selected from the sets of holes 14 in FIG. 1 so that the ratchet faced member is located at a desired position along the length of the workbench jaw.

A second pair of holes aligned with 196 and 198 may be formed in the lower plate 194 such as shown at 204 in relation to hole 198 so that the pegs 200 and 202 can be pushed completely through both plates as well as the clamping bench jaw 10.

In a preferred arrangement the length of the channel 190 is commensurate with the length of the workbench jaw 10 so that the ratchet teeth 186 will extend along the whole length of the clamping jaw 10.

A similar device albeit rotated through 180° may be fitted to the opposed clamping bench jaw 12 in a similar manner.

Only one such device is needed if a device such as shown in FIG. 11 is incorporated, whereas two such devices are required if a device such as shown in FIG. 13 is to be fitted.

Figure 16:
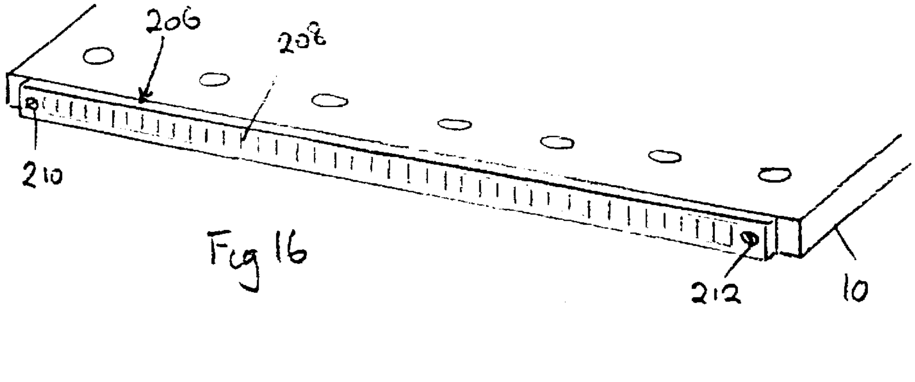
FIG. 16 shows a further alternative device to that of FIG. 14.

A further modification is shown in FIG. 16 in which an elongate metal or plastics strip generally designated 206 and formed in its external face with a ratchet profile 208 is shown secured to the inboard edge of workbench jaw 10 by means of two screws 210 and 212.

Again a similar member can be fitted to the inboard face of the workbench jaw 12 if two such sets of ratchet teeth are required.

Although not shown, the ratchet profile 208 may be dispensed with and particularly if the elongate strip 206 is formed from hardened plastics material or metal, the ratchet profile may be replaced by a plurality of equally spaced notches, apertures, holes or indentations into which the end of the lever arm 142 can fit and be trapped.

Since it is not essential that the ratchet teeth or apertures or other indentations are continuous along the whole length of the strip 206, one or more regions may be left devoid of such teeth, apertures or indentations through which further screws can be fitted to more securely retain the strip 206 on the face of the workbench jaw.

FIG. 17 illustrates an alternative form of peg stop incorporating one of the aspects of the invention.

The stop is shown upside down in FIG. 17A and is shown fitted with its peg in one of the openings of a workbench jaw 12 in FIG. 17B.

The peg stop comprises a cylindrical peg 214 extending from a flat underside surface 216 of a rectangular block 218. Typically the peg and block are formed integrally as by plastics injection moulding.

The peg may be a hollowed cylinder or a solid cylindrical member and the rectangular block 218 may be partly hollow or itself may be solid.

The distinguishing characteristic of the device is that the peg 214 extends asymmetrically from the surface 216 nearer to one end than the other. This means that when inserted in a cylindrical hole such as one of the holes 16 in the jaw 12, it can be rotated relative to the hole and workbench jaw 12 and in doing so, after each 90° rotation will present a different face as an end stop as viewed along the length of the jaw 12. Because of the asymmetry, the offset of the workpiece engaging face from the axis of the hole through which the peg 214 is fitted will differ. In the case of an arrangement in which the peg 214 is mounted centrally between the two longer faces of the block 218, three variations in offset can be obtained using end face 220 in one position, 222 in another position, and 224 in the third position. Since in this embodiment the axis of the peg 214 is equidistant from 222 and 226, no differential offset will be obtained by further rotation of the block 218.

If the peg 214 is mounted as symmetrically in two dimensions so that it is not midway between either of the two pairs of faces 222 and 226 on the one hand, and 220 and 224 on the other, then four different offsets can be obtained by careful selection of the position of the peg 214 in relation to the face 216. In this event, rotation of the block 218 through 360° will allow four different offsets to be obtained, depending on which of the faces 220, 222, 224 and 226 is presented to the workpiece.

The peg stop shown in FIG. 17 may be used in conjunction with similar peg stops located in three other openings in the two workbench jaws 10 and 12, two peg stops in each of the jaws, and considerable variation in distance between workpiece engaging faces of the blocks can be obtained by locating blocks in different ones of the holes and rotating the blocks as required.

Devices such as shown in FIG. 17 can be used in conjunction with any of the movable supplementary clamping devices such as 36 shown in Figures and those shown in FIGS. 10, 11 and 13.

FIGS. 18A, 18B and 18C illustrate how a peg stop having one degree of asymmetry in which the peg is mounted equidistant between the two longer faces 222 and 226, can be rotated into three different positions to present three different working distances between the workpiece engaging face of the block 218 and a fixed end stop 228.

In each case the distance between the opposed workpiece engaging faces of the stop is denoted by L1, L2 and L3, and it will be seen that this is smallest in FIG. 18A, is somewhat larger in FIG. 18B and is at its maximum in FIG. 18C.

Figure 19:
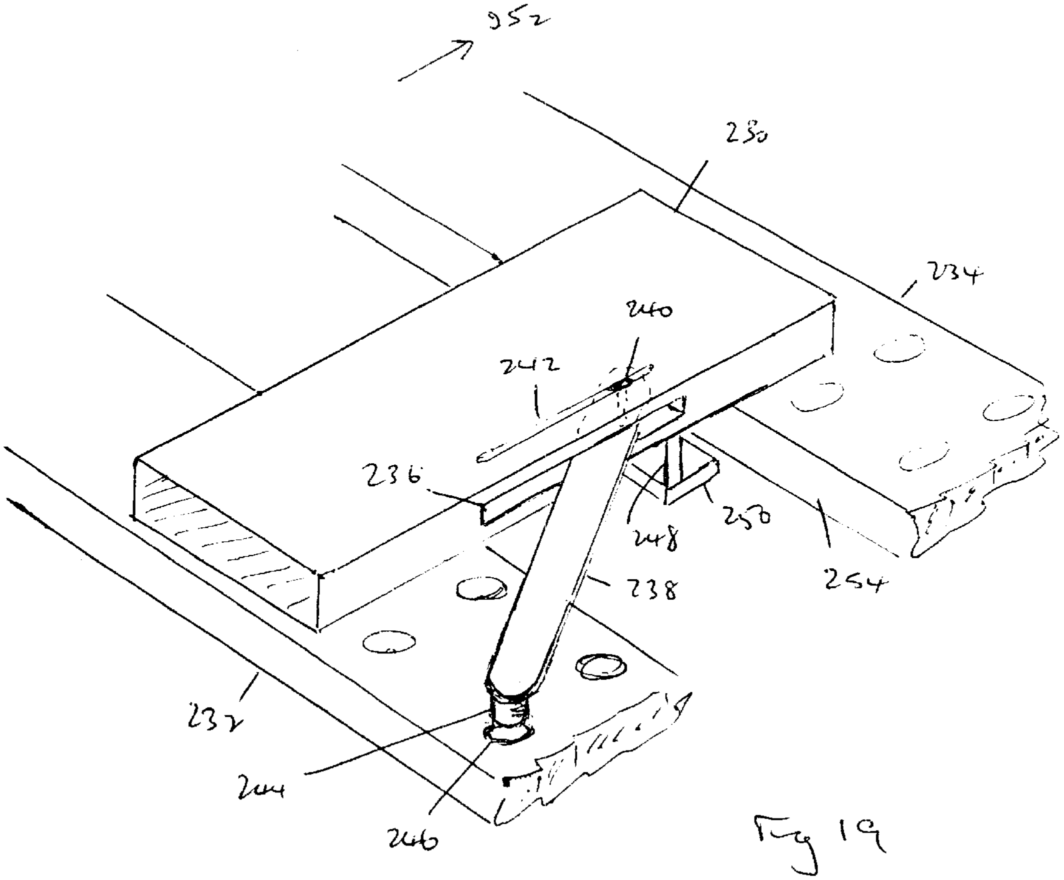
FIG. 19 is a perspective view of another secondary clamp which may be used with conventional peg stops or another similarly constructed secondary clamp pegged to the main workbench jaws.

FIG. 19 illustrates a preferred secondary clamp which comprises an elongate supplementary clamp jaw 230 adapted to rest perpendicularly across the main jaws 232, 234 of a clamping workbench having drive means (not shown) for moving the main jaws 232, 234 towards and away from each other in manner known per se. The jaw 230 includes a slot 236 which receives one end of an arm 238 which is he-d captive in the slot for pivoting and sliding relative to the jaw. Typically it is held in place by pin 240 the ends of which are received in two aligned slots in the upper and lower faces of the jaw 230, one of which is denoted by reference numeral 242. The other end of the arm 238 has a peg 244 for fitting into one of the peg stop receiving openings 246 in one of the main jaws—jaw 232 as shown.

Beneath the jaw 230 is an L-shaped retention device having a leg 248 and a foot 250. The latter extends parallel to the jaw 230 and the latter can be slid in the direction of arm 252 so as to engage the edge 254 of the jaw 234.

Figure 20A:
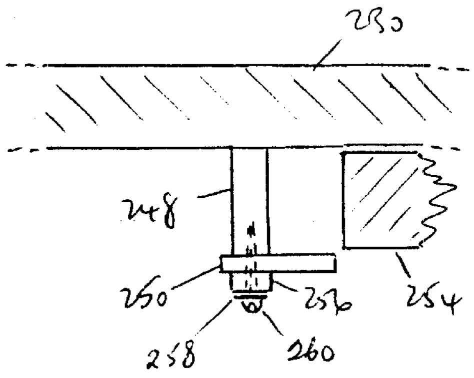
FIGS. 20(A) and 20(B) show how the spacing between a retaining lug and the secondary clamp can be adjusted.

FIG. 20(A) shows the leg 248 and foot 250 of the retention device of FIG. 15, in more detail. A spacer 256 is trapped between the lower end of the leg 248 and a washer 258, the assembly of foot 250, spacer 256 and washer 258 being secured in place by one or more screws or bolts 260.

Figure 20B:
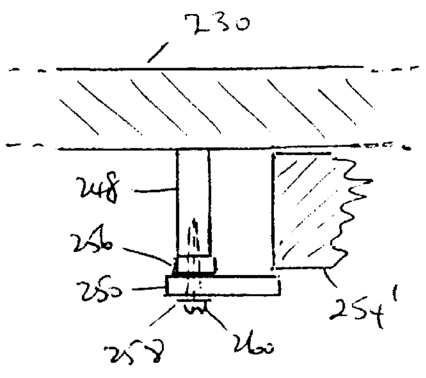

FIG. 20(B) shows the foot 250 located further away from the underside of the jaw 230 by locating the spacer 256 between the end of the leg 248 and the foot 250. As in FIG. 20(A) the foot and spacer are secured in place by means of one or more screws or bolts 260 and washers 258.

What is claimed is:

1. A clamping workbench comprising a main pair of jaws, a support carrying the main jaws, a workbench drive means operable to move the main jaws in a direction towards and away from one another, and further comprising detachable supplementary clamping jaw means fitted to the main jaws and comprising supplementary jaws and a linkage, the linkage extending between the supplementary jaw means and the main jaws and being operatively connected to the main jaws, wherein the linkage constitutes a second drive means, and wherein upon operation of the workbench drive means, the operative connection serves to translate the motion of the main jaws into a movement perpendicular to the main jaw motion, the operative connection being such as to accommodate and translate movement of the main jaws both towards and away form each other, and wherein the or each supplementary jaw means includes a retaining device for engaging the underside of one of the main jaws to prevent the supplementary jaw means from lifting off the main jaws.

2. A clamping workbench as claimed in claim 1, in which the main jaws have openings therein into which pegs can be pushed to provide workpiece edge stops upstanding through the workbench jaws, in combination with an improved peg stop therefor, in which each peg includes a head and is mounted asymmetrically relative to its head.

3. A clamping workbench as claimed in claim 2 in which the peg of the peg stop is fitted in one of the peg receiving openings and rotatable in or insertable in different orientations into the opening, so as to provide different spacings between a clamping face and the axis of the offset peg to thereby adjust the distance between the clamping face of the peg and another peg stop fitted into another opening in the workbench jaws.

4. A clamping workbench as claimed in claim 1, in combination with stop means adapted to be fitted to at least one of the main workbench jaws at a position remote from the supplementary jaw means to enable a workpiece to be clamped between the stop means and the supplementary jaw means as the latter is moved towards the stop means.

5. A clamping workbench as claimed in claim 4, wherein the stop means is a second supplementary jaw means adapted to be fitted to the workbench so as similarly to extend transversely of the main jaws, but spaced from the first supplementary jaw means.

6. A clamping workbench as claimed in claim 1, wherein the retaining device is adjustable relative to the underside of the jaws to which it is attached, to allow clamping workbench jaws of differing thicknesses to be accommodated.

7. A clamping workbench as claimed in claim 1, which is securable to the main jaws through a linkage which transmits the motion of the main jaws into a direction perpendicular to that motion, the said linkage comprising a second drive means to produce the movement of the supplementary jaw means.

8. A clamping workbench as claimed in claim 1, wherein the second drive means comprises a single lever pivotally attached at one end to the supplementary jaw and adapted by a peg at its other end to be fitted into a circular hole in one of the main jaws, and the retaining device is adapted to embrace the inward facing edge of the other of the main workbench jaws.

9. A clamping workbench as claimed in claim 7, wherein the second drive means includes at least one lever which includes a peg adapted to be fitted into an opening in the main jaw.

10. A clamping workbench as claimed in claim 1 for fitting above the workbench jaws of a clamping workbench comprising second drive means for shifting the supplementary clamping jaw at right angles to the direction of clamping movement of the workbench jaws in response to inward or outward movement thereof, wherein the second drive means is adapted to fit between the opposed clamping faces of the workbench jaws.

11. A clamping workbench as claimed in claim 10, wherein the second drive means comprises lever means acted on by spring means to engage a clamping five of one of the workbench jaws.

12. A clamping workbench as claimed in claim 11, wherein two sprung (lever) levers are provided for engaging both opposed clamping faces of two workbench jaws to provide a symmetrical arrangement.

13. A clamping workbench as claimed in claim 10, wherein each workbench jaw clamping face which is engaged by the lever means is formed with a plurality of pockets spaced apart therealong and adapted to accept and retain therein one end of a second drive lever.

14. A clamping workbench as claimed in claim 13, wherein the pockets are formed by openings or slots in the jaw surface or comprise a ratchet attached to or embedded at least in part in the jaw surface, or a strip of wood or metal of plastics material having openings formed therein and fitted to the edge of the jaw or a frame adapted to fit snugly over the whole workbench jaw, whose outer surface which overlies the clamping face of the jaw has openings or pockets formed therein.

15. A clamping workbench as claimed in claim 1 in which the supplementary jaw means is fitted to the clamping workbench and mounted transversely to the main jaws thereof at a position spaced from the stop means carried by the main jaws, whereby operation of the said first drive means in one sense will increase the distance between the supplementary jaw means and the stop means and operation of the said first drive means in the opposite sense will decrease the distance between the said supplementary jaw means and the stop means.

16. A clamping workbench as claimed in claim 2, in which the peg and the openings into which the peg is to be fitted are of similar circular cross-section whereby the peg stop is rotatable in each of the openings into which it is fitted so as to offset the workpiece engaging face of the head thereof by different distances from the peg axis by appropriate rotation thereof.

17. A clamping workbench as claimed in claim 2 wherein the peg is one of square and triangular cross-section and the openings into which it is to be fitted are of a similar cross-sectional shape and size thereby allowing for a corresponding number of orientations to be achieved by lifting the peg stop and reinserting it into any one opening, thereby to provide for a variation in the offset of the workpiece engaging face of the head relative to the peg axis.

18. A clamping workbench as claimed in claim 8 wherein the pivoting engagement of the lever with the supplementary jaw is achieved by pin means, engageable in aligned slots in the supplementary jaw.

19. A supplementary clamping jaw when fitted transversely across the main jaws of a clamping workbench for engaging one edge of a workpiece for clamping the latter between the supplementary jaw and stop means fitted to the main clamping jaws, comprising:

(a) an elongate member (b) a lever pivotable at one end relative to the elongate member and having peg means at its other end engaging in an opening in one of the main clamping jaws, whereby in use appropriate relative movement of the main jaws will result in lateral movement of the elongate member perpendicular to the movement of the main jaws, to achieve the workpiece clamping action.

20. A supplementary clamping jaw and clamping workbench as claimed in claim 17, wherein the said one end of the lever includes pin means extending therefrom engaging in slot means in the elongate member, to provide for sliding movement of the lever to an end of the slot means, after which only the pivoting movement can occur.

* * * * *